United States Patent
Wolff-Petersen (10) Patent No.: US 10,671,260 B2
(45) Date of Patent: Jun. 2, 2020

(54) SYSTEM AND METHOD FOR DISTRIBUTING USER INTERFACE DEVICE CONFIGURATIONS

(71) Applicant: STEELSERIES APS, Frederiksberg (DK)

(72) Inventor: Jacob Wolff-Petersen, Richmond (GB)

(73) Assignee: STEELSERIES APS, Frederiksberg (DK)

( * ) Notice: Subject to any disclaimer, the term of this patent is extended or adjusted under 35 U.S.C. 154(b) by 932 days.

(21) Appl. No.: 15/246,674

(22) Filed: Aug. 25, 2016

(65) Prior Publication Data
US 2016/0364130 A1    Dec. 15, 2016

Related U.S. Application Data (63) Continuation of application No. 14/874,538, filed on Oct. 5, 2015, now Pat. No. 9,455,877, which is a
(Continued)

(51) Int. Cl.
*G06F 3/0484* (2013.01)
*G06F 9/4401* (2018.01)
(Continued)

(52) U.S. Cl.
CPC ........ *G06F 3/04847* (2013.01); *A63F 13/214* (2014.09); *A63F 13/23* (2014.09); *A63F 13/25* (2014.09); *A63F 13/31* (2014.09); *A63F 13/327* (2014.09); *A63F 13/35* (2014.09); *G06F 3/02* (2013.01); *G06F 3/0482* (2013.01); *G06F 3/04842* (2013.01); *G06F 9/4411* (2013.01); *G06F 13/102* (2013.01); *G07F 17/3227* (2013.01); *H04L 41/0806* (2013.01);
(Continued)

(58) Field of Classification Search
None
See application file for complete search history.

(56) References Cited

U.S. PATENT DOCUMENTS 6,009,153 A    12/1999    Houghton et al.
6,041,183 A    3/2000    Hayafune
(Continued)

FOREIGN PATENT DOCUMENTS

WO    200703181    3/2007
WO    2007139349    12/2007
WO    2010001256 A2    1/2010

OTHER PUBLICATIONS

Gui Mods, "Free Windows Vista Themes and Resources", 2 pages, http://www.guirnods.com/, website last visited Jul. 1, 2008.
(Continued)

*Primary Examiner* — Alan Chen
(74) *Attorney, Agent, or Firm* — Guntin & Gust, PLC; Andrew Gust (57) ABSTRACT

A system that incorporates teachings of the present disclosure may include, for example, a system having a controller to collect a plurality of User Interface (UI) device configurations, receive a request from a computing device to download one or more of the plurality of UI device configurations, and transmit to the computing device the one or more UI device configurations requested to configure one or more UI devices of the computing device. Other embodiments are disclosed.

20 Claims, 4 Drawing Sheets

Related U.S. Application Data continuation of application No. 14/638,769, filed on Mar. 4, 2015, now Pat. No. 9,184,990, which is a continuation of application No. 14/287,581, filed on May 27, 2014, now Pat. No. 9,003,070, which is a continuation of application No. 13/684,609, filed on Nov. 26, 2012, now Pat. No. 8,775,688, which is a continuation of application No. 13/334,916, filed on Dec. 22, 2011, now Pat. No. 8,341,305, which is a continuation of application No. 13/042,079, filed on Mar. 7, 2011, now Pat. No. 8,108,566, which is a continuation of application No. 12/167,342, filed on Jul. 3, 2008, now Pat. No. 7,925,797.

(51) Int. Cl.
*G07F 17/32* (2006.01)
*H04M 1/72* (2006.01)
*G06F 3/02* (2006.01)
*G06F 13/10* (2006.01)
*A63F 13/35* (2014.01)
*H04L 12/24* (2006.01)
*A63F 13/23* (2014.01)
*A63F 13/31* (2014.01)
*A63F 13/214* (2014.01)
*A63F 13/25* (2014.01)
*A63F 13/327* (2014.01)
*G06F 3/0482* (2013.01)
*H04L 29/08* (2006.01)

(52) U.S. Cl.
CPC .......... *H04L 41/0809* (2013.01); *H04L 41/22* (2013.01); *H04L 67/34* (2013.01); *H04M 1/72* (2013.01)

(56) References Cited

U.S. PATENT DOCUMENTS

| | | | |
|---|---|---|---|
| 7,146,435 B2 | 12/2006 | Williams et al. | |
| 7,652,660 B2 | 1/2010 | Chen et al. | |
| 7,743,012 B2 | 6/2010 | Chambers et al. | |
| 8,843,853 B1 | 9/2014 | Smoak et al. | |
| 9,086,737 B2* | 7/2015 | Smith | G06F 3/0238 |
| 2002/0149704 A1 | 10/2002 | Kano et al. | |
| 2003/0103088 A1 | 6/2003 | Dresti | |
| 2004/0048668 A1 | 3/2004 | Brosnan | |
| 2005/0101309 A1 | 5/2005 | Croome et al. | |
| 2005/0134348 A1 | 6/2005 | Bolay | |
| 2006/0058103 A1 | 3/2006 | Danieli et al. | |
| 2006/0068911 A1 | 3/2006 | Pirich | |
| 2006/0143572 A1 | 6/2006 | Scott | |
| 2006/0149809 A1 | 7/2006 | Salo et al. | |
| 2006/0156209 A1 | 7/2006 | Matsuura et al. | |
| 2007/0051792 A1* | 3/2007 | Wheeler | G06F 3/0238 235/375 |
| 2007/0211035 A1 | 9/2007 | Marcus et al. | |
| 2007/0249422 A1 | 10/2007 | Podoloff et al. | |
| 2007/0271497 A1 | 11/2007 | Novak | |
| 2008/0007531 A1 | 1/2008 | Chen | |
| 2008/0082594 A1 | 4/2008 | Soltes et al. | |
| 2008/0165035 A1 | 7/2008 | Bhella et al. | |
| 2008/0307454 A1 | 12/2008 | Ahanger | |
| 2008/0313315 A1* | 12/2008 | Karaoguz | H04W 8/18 709/222 |
| 2009/0055759 A1 | 2/2009 | Svendsen | |
| 2009/0288022 A1 | 11/2009 | Almstrand et al. | |
| 2009/0307105 A1* | 12/2009 | Lemay | G06F 8/61 705/26.1 |
| 2010/0005196 A1 | 1/2010 | Wolff-Petersen | |
| 2011/0018793 A1* | 1/2011 | Chen | G06F 1/1632 345/156 |
| 2011/0021269 A1 | 1/2011 | Wolff-Peterson | |
| 2011/0093814 A1 | 4/2011 | Haughawout et al. | |
| 2011/0118022 A1 | 5/2011 | Aronzon et al. | |
| 2011/0157024 A1 | 6/2011 | Chao | |
| 2018/0188917 A1 | 7/2018 | Wolff-petersen et al. | |

OTHER PUBLICATIONS

Patent Cooperation Treaty, "International Search Report and Written Opinion", ISAIEP, by Officer Pawel Kusnierczak, in PCT Application No. PCTIIB2009/006551, dated Jan. 7, 2010.

Themes Unlimited, "Horne of the Best Desktop on the Net", 4 pages, http://www.thernesunlirnited.com/, website last visited Jul. 1, 2008.

* cited by examiner

SYSTEM AND METHOD FOR DISTRIBUTING USER INTERFACE DEVICE CONFIGURATIONS

CROSS-REFERENCE TO RELATED APPLICATIONS

This application is a continuation of U.S. patent application Ser. No. 14/874,538, filed Oct. 5, 2015, which is a continuation of U.S. patent application Ser. No. 14/638,769, filed Mar. 4, 2015, now U.S. Pat. No. 9,184,990, which is a continuation of U.S. patent application Ser. No. 14/287,581, filed May 27, 2014, now U.S. Pat. No. 9,003,070, which is a continuation of U.S. patent application Ser. No. 13/684,609, filed Nov. 26, 2012, now U.S. Pat. No. 8,775,688, which is a continuation of U.S. patent application Ser. No. 13/334,916 filed on Dec. 22, 2011, now U.S. Pat. No. 8,341,305, which is a continuation of U.S. patent application Ser. No. 13/042,079 filed on Mar. 7, 2011, now U.S. Pat. No. 8,108,566, which is a continuation of U.S. patent application Ser. No. 12/167,342 filed on Jul. 3, 2008, now U.S. Pat. No. 7,925,797, the disclosures of all of which are hereby incorporated herein by reference herein in their entirety.

FIELD OF THE DISCLOSURE

The present disclosure relates generally to user interface devices, and more specifically to system and method for distributing user interface device configurations.

BACKGROUND

It can be technically complex and time consuming for users to configure User Interface (UI) devices such as a navigation device (e.g., computer mouse, game controller, etc.), keyboard, display and/or audio system (e.g., a loud speaker system, headset, etc.) for a computing device such as a computer, gaming system, media player, or like device. Additionally, there may be instances where a user may desire to vary UI device configurations between software applications with UI-related features.

DETAILED DESCRIPTION

One embodiment of the exemplary embodiments entails a method including receiving a request from a first computing device for User Interface (UI) device configurations and in response to receiving the request, providing configuration data associated with a plurality of UI device configurations to the first computing device for presentation of a Graphical User Interface (GUI) associated with the plurality of UI device configurations. The request is received by a server that is remote from the first computing device, and the server is in communication with the first computing device over a network. The GUI categorizes the plurality of UI device configurations according to one or more social networks of subscribers.

Another embodiment entails a server including a memory and a controller programmed to receive a first User Interface (UI) device configuration from a first computing device that is associated with a first gamer and to provide configuration data over a network to a second computing device for presentation of a Graphical User Interface (GUI) that displays a plurality of UI device configurations including the first UI device configuration. The GUI identifies the first gamer with the first UI device configuration.

Another embodiment entails a non-transitory computer-readable storage medium including computer instructions for receiving a request from a computing device for User Interface (UI) device configurations, receiving ratings information associated with at least a portion of a plurality of UI device configurations, generating ratings data based on the ratings information, and in response to receiving the request, providing the ratings data to the computing device for presentation of a Graphical User Interface (GUI) associated with the plurality of UI device configurations. The GUI presents satisfaction ratings based on the ratings data.

Another embodiment entails a method in a computing device involving presenting a plurality of selectable User Interface (UI) device configurations distributed by a remote system, directing the remote system to supply the computing device one or more of the plurality of UI device configurations, receiving from the remote system the one or more UI device configurations, and configuring a UI device of the computing device according to at least one of the one or more UI device configurations. The plurality of UI device configurations can be supplied to the remote system by a plurality of subscribers of the remote system.

Another embodiment entails a system having a controller to collect a plurality of UI device configurations, receive a request from a computing device to download one or more of the plurality of UI device configurations, and transmit to the computing device the one or more UI device configurations requested to configure one or more UI devices of the computing device. The plurality of UI device configurations can be supplied by a plurality of users of the system.

Another embodiment entails a UI device having a circuit element operated by a computing device according to one of a plurality of UI device configurations supplied to the computing device by a remote system. The remote system can receive the plurality of UI device configurations from a plurality of subscribers of the remote system.

Figure 1:
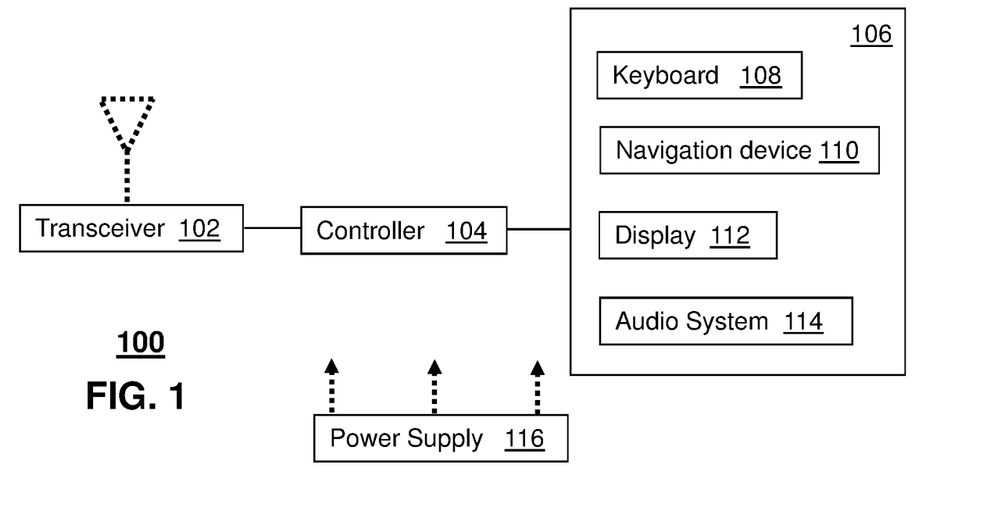
FIG. 1 depicts an illustrative embodiment of a computing device.

FIG. 1 depicts an illustrative embodiment of a computing device 100. The computing device 100 can comprise a wireline or wireless transceiver 102 (herein transceiver 102), a group of user interface (UI) devices 106, a power supply 116, and a controller 104 for managing operations thereof. The transceiver 102 can utilize common wireless access technologies such as cellular, software defined radio (SDR) and/or WiMAX technologies, among others. Cellular technologies can include, for example, CDMA-1X, UMTS/HSDPA, GSM/GPRS, TDMA/EDGE, EV/DO, and next generation wireless access technologies as they arise.

In another embodiment, the transceiver 102 can support short-range wireless access technologies such as Bluetooth, WiFi, or cordless technologies such as Digital Enhanced Cordless Telecommunications (DECT) or Personal Handyphone System (PHS). In yet another embodiment the transceiver 102 can support wireline technologies such as a Transmission Control Protocol (TCP) operating in conjunction with an Internet Protocol (IP) for exchanging messages in a public Internet network over a Digital Subscriber Line (xDSL) or cable interface.

The group of UI devices 106 can include a depressible or touch-sensitive keyboard (or keypad) 108, a navigation device 110 such as a computer mouse with an optical sensor and/or roller ball, wheel or navigation disk with one or more selection buttons, a game controller or other suitable navigation system for manipulating operations of the computing device 100. The group of UI devices 106 can further include a display 112 such as monochrome or color LCD (Liquid Crystal Display) for conveying images to the end user of the computing device 100. In an embodiment where the display 112 is touch-sensitive, a portion of the keyboard 108 can be presented by way of the display.

The group of UI devices 106 can also include an audio system 114 that utilizes common audio technology for conveying low volume audio (e.g., audio heard only in the proximity of a human ear such as by way of a headset) and high volume audio such as a loud speaker for mono or stereo audio presentations, hands free operation, or other suitable uses. The audio system 114 can further include a microphone for intercepting audible signals of an end user thus enabling voice communications over a common communication network and/or for speech recognition applications. The group of UI devices 106 can in whole or in part be an integral part of a housing assembly of the computing device 100. For example, a portion of the audio system 114 can be a headset with a built-in microphone which couples to a portion of the audio system which is an integral part of the housing assembly of the computing device 100.

The power supply 116 can utilize common power management technologies such as replaceable batteries, supply regulation technologies, and charging system technologies for charging the replaceable batteries and for supplying energy to the aforementioned components of the computing device 100, thereby facilitating portable applications. The power supply 116 can also utilize singly or in combination power management technologies that receive power from a common power outlet and supply regulated energy to the components of the computing device 100. The controller 106 can utilize computing technologies such as a microprocessor and/or digital signal processor (DSP) with an associated storage memory(ies) such a mass storage device (e.g., hard drive), Flash, ROM, RAM, SRAM, DRAM or other storage technologies.

The computing device 100 of FIG. 1 can represent without limitation a laptop computer, a desktop computer, a server, a mobile phone (e.g., cell phone), a short-range mobility phone (e.g., a cordless or wired office or home phone), or a gaming system operatively coupled to a communication network for on-line or localized gaming Other computing device embodiments suitable to the present disclosure are considered within the scope of the claims described below.

Figure 2:
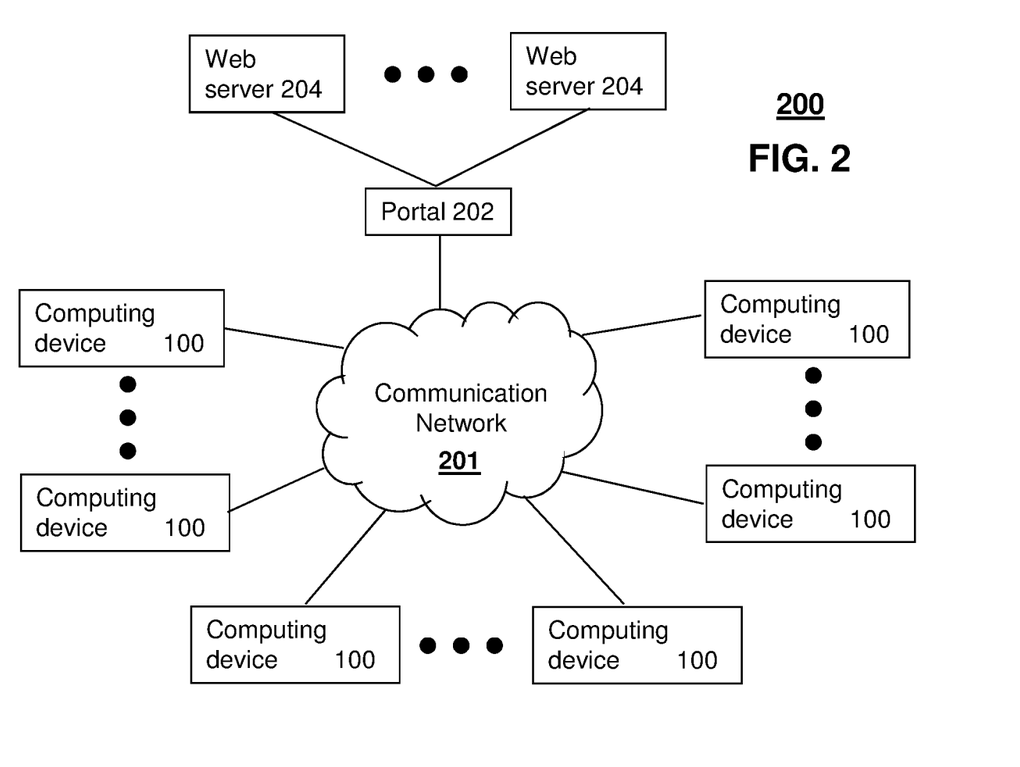
FIG. 2 depicts an illustrative embodiment of a communication system.

FIG. 2 depicts an illustrative embodiment of a communication system 200. The communication system 200 can comprise a portal 202 operating from one or more common web servers 204. The portal 202 can be communicatively coupled to a plurality of computing devices 100 representing any of the aforementioned embodiments of the computing device of FIG. 1. The computing devices 100 can exchange messages with the portal 202 by way of the communication network 201 which can utilize common circuit-switching technology and/or packet-switching technology to support communication sessions therebetween. The circuit-switching or packet-switching technologies can correspond to common wireline or wireless access technologies supportive of the access technologies previously described for the computing device 100 of FIG. 1, as well as combinations thereof.

Figure 3:
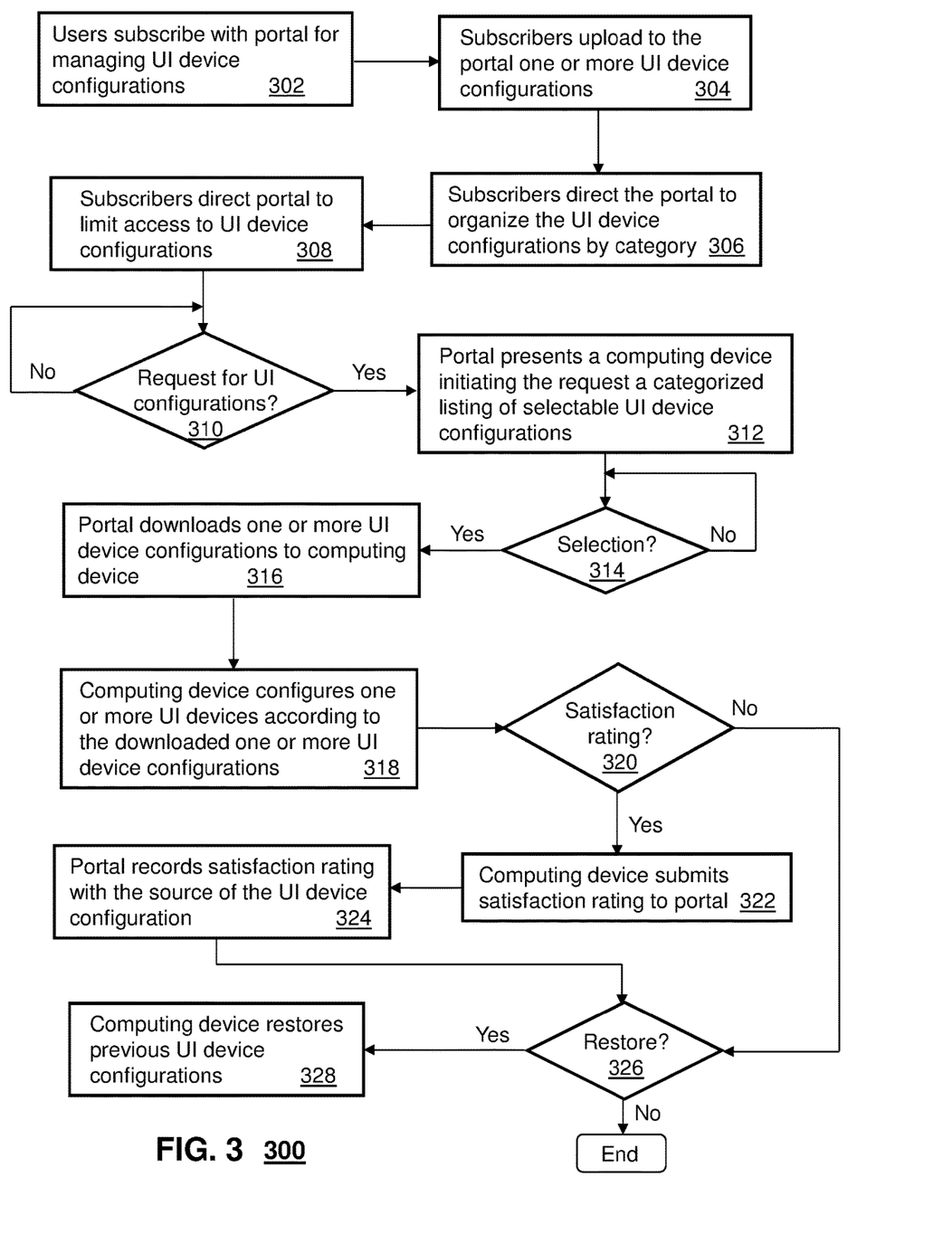
FIG. 3 depicts an illustrative embodiment of a method operating in the communication system of FIG. 2.
Figure 4:
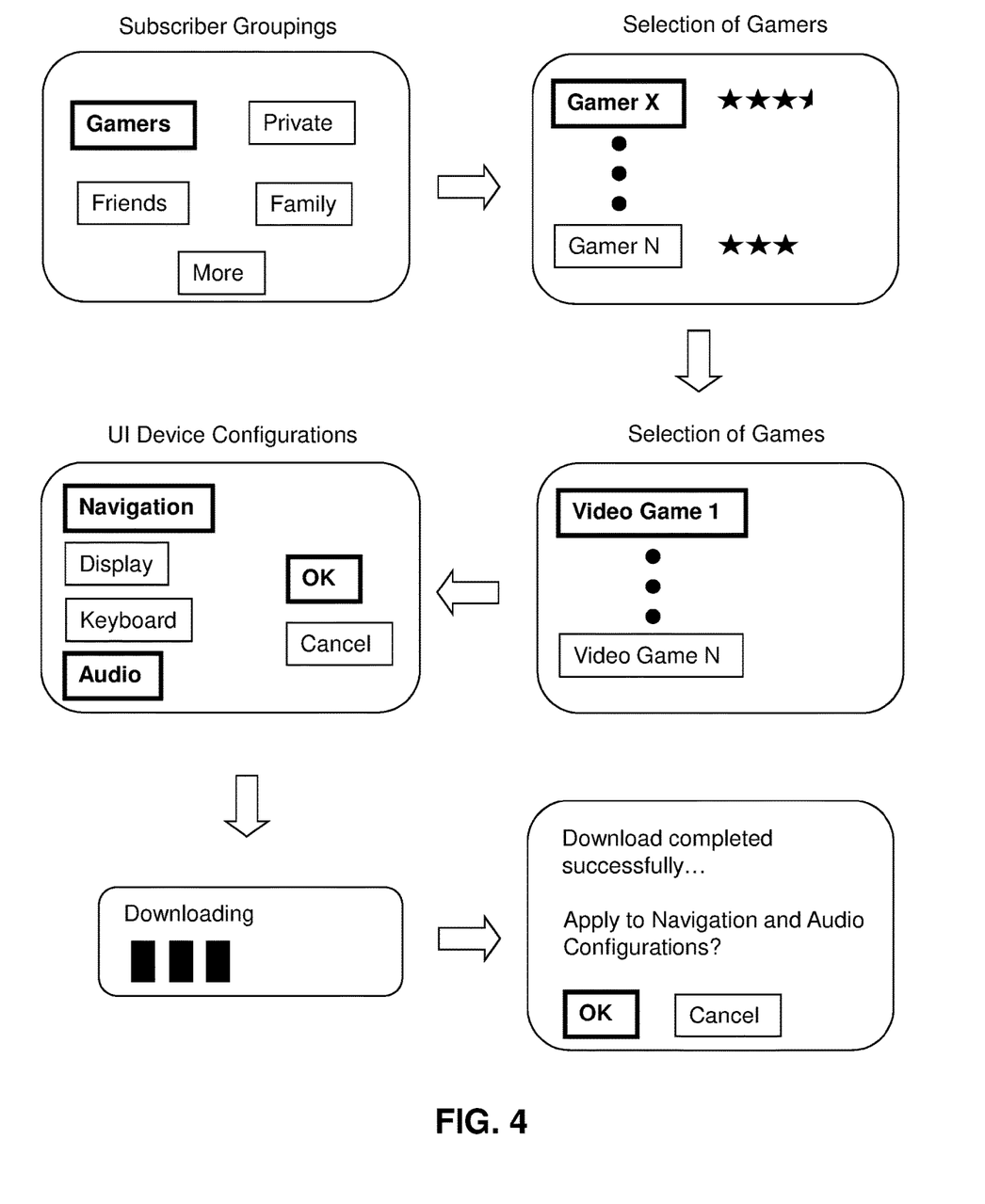
FIG. 4 depicts an embodiment of a graphical user interface illustrative of the method of FIG. 3.

The portal 202 can support the exchange of UI device configurations as described by method 300 of FIG. 3. FIG. 4 depicts an embodiment of a graphical user interface illustrative of method 300.

Method 300 can begin with step 302 in which users of computing devices 100 subscribe to the portal 202 to manage UI device configurations. Each user can access the portal 202 by way of a common Internet browser (e.g., Mozilla Firefox™ Internet Explorer™, etc.). The subscription process can entail a policy in which each prospective subscriber provides contact information (e.g., first and last name, email address, telephone number, etc.). Once a user becomes a subscriber, the portal 202 can assign the user a login name and a password defined by the subscriber or the portal. The services of the portal 202 can be free of charge, at a fee commensurate with the services provided, or in accordance with specific promotions a combination of free services for some subscribers and fee-based services for others.

In step 304, the subscribers can upload to the portal one or more UI device configurations utilized by their computing device 100. In the present context, a UI device can correspond to any device that can serve as a user interface that presents and/or controls in part operations of the computing device 100. Common forms of UI devices can include without limitation a keyboard 108, a navigation device 110, a display 112, or an audio system 114 with any of the embodiments previously described for the computing device 100 of FIG. 1. Method 300 can also be applied to other forms of UI devices not described herein that at the present time or in future generations of computing devices can serve as a user interface.

UI device configurations can take on innumerable embodiments. For example, a keyboard configuration can correspond to one or more character macros created by the subscriber uploading the configurations to the portal. Macros can be useful for reducing time to enter a sequence of characters, or can also be used to reassign keys of the keyboard. For example, a subscriber may find it useful in certain gaming applications to reassign keys (e.g., the number "9" reassigned to the letter "R"). Thus, when a particular game is running the selection of the "R" key produces a character output of "9" as if the "9" key had been depressed. Similarly, the subscriber can create a macro in which two or more keystrokes are generated from a single keystroke. For example, a macro can be created so that when the "F11" key is selected, a sequence of characters can be associated and generated with the selection of this key; for instance, selecting F11 can be designed to produce the character string "Hello". In addition to macros, the subscriber can upload keyboard configurations managed by an operating system (OS) of the computing device. OS-related keyboard configurations can include without limitation a character repeat delay configuration, a character repeat rate configuration, a cursor blink rate configuration, a software driver for the keyboard, or combinations thereof.

A display configuration can correspond to color calibration settings of the display, sharpness settings of the display, refresh rate settings of the display, a desktop configuration, a window appearance configuration, a display resolution configuration, a configuration for a plurality of monitors that expand the desktop capacity of a computing device, a touch-sensitivity configuration for touch-sensitive displays, a software driver for the display, or combinations thereof.

A navigation device configuration can correspond to one or more navigation button configurations, a selection speed configuration for the one or more navigation buttons, a selection lock configuration for the one or more buttons, a pointer selection configuration, a pointer speed configuration, a snap configuration for the pointer, a visibility configuration for the pointer, a configuration for a rotational mechanism of the navigation device, a navigation lift configuration for establishing a bottom surface detection setting of an optical sensor (or similar surface sensor) of the navigation device, an accelerometer configuration, a software driver for the navigation device, or combinations thereof.

An audio system configuration can correspond to a volume configuration, a balance configuration, an audio equalization configuration, a stereo configuration, a noise reduction configuration, a digital audio playback configuration, an audio configuration for actions taken by the navigation device, a configuration of a microphone of the audio system, a multi-dimensional audio settings (e.g., 3 or more dimensions such as a 5.1 audio configuration, 7.1 audio configuration, and so on), a software driver for the audio system, or combinations thereof.

From these illustrative embodiments of UI device configurations, a subscriber of the portal 202 can submit to the portal any portion of the aforementioned configurations or other suitable UI device configurations for archiving purposes. The submission process can take place by way of a software application operating in the computing device 100 which is capable of retrieving UI device configurations from an operating system of the computing device or from another suitable storage location in the computing device or remote to the computing device (e.g., an external local or remote hard drive, remote server, etc.). The software application can be managed by the subscriber (user) of the computing device 100.

In step 306, subscribers can direct the portal 202 by way of a browser of the computing device 100 to organize the UI device configurations. For instance, a portion of subscribers having an interest for gaming may desire to organize their UI device configurations amongst a social network of gamers. Another portion of subscribers may want to create a social network of friends and family Other subscribers may be less discriminating and choose to share their UI device configurations with any subscriber of the portal 202. Thus, any social and/or organizational hierarchy can be created by the subscribers, and/or a service provider of the portal 202. The subscribers can also establishing in step 308 sharing limitations of the UI device configurations by limiting the community of subscribers that can access their archived UI device configurations.

For example, some subscribers can define a buddy list for exchanging UI device configurations only with subscribers listed in the buddy list. Other subscribers can choose not to share their UI device configurations with any subscribers. Such subscribers can choose to use the portal 202 for private purposes such as for ease of portability between computing devices 100. For instance, if a subscriber changes computing devices 100, said subscriber can access the portal 202 by way of a common browser and download a software application to the computing device 100 to assist the subscriber in the transfer of the subscriber's UI device configurations to the new computing device. Before updating the UI device configurations of the new computing device 100, the software application can store preexisting settings in the event the subscriber wants to restore these setting at some point in time. This feature can be useful in situations where the subscriber desires to transition between computing devices 100 on a temporary basis (e.g., renting or borrowing a computing device). This restoration technique can also be applied to subscribers that share UI device configurations.

Once the UI device configurations have been uploaded and organized with sharing limitations, the portal 202 can monitor requests generated by computing devices 100 of subscribers requesting a presentation in step 312 of available UI device configurations, which can be downloaded and applied to the UI devices of the requesting computing device in steps 316-318 once a selection is detected in step 314. Steps 316-318 can also include a process or recording preexisting UI device configurations before they are changed in the event the subscriber later desires restore them.

FIG. 4 depicts illustrative embodiments of graphical user interface (GUI) snapshots of portions of steps 312-318. In this illustration a first GUI presented by the computing device 100 of a subscriber depicts subscriber groupings which can be established by the subscriber in step 306 and/or the service provider of the portal 202. In this illustration, the GUI shows groupings for "Gamers", "Friends", "Family", "Private", and others which can be viewed by selecting "More".

The Gamers GUI button can represent a social networking list of subscribers interested in gaming A Friends or Family GUI button can represent a limited set of subscribers sharing UI device configurations that have been selectively defined in step 306 by a subscriber. The Private GUI button can represent UI device configurations which the subscriber of the portal 202 does not share with other subscribers. In illustration purposes only, it is assumed that the subscriber selects the Gamers GUI button (depicted by the bold font and thicker outline). Responsive to said selection, the portal 202 presents a new GUI with a selection of Gamers. Each gamer can be identified by name or pseudo name and can be assigned an average rating determined from an aggregation of ratings collected by the portal 202 from subscribers associated with the Gamers grouping. The more stars depicted next to a gamer, the higher a rating of satisfaction by subscribers downloading the UI device configurations supplied by the gamer.

In this illustration, the subscriber selects Gamer X perhaps because of a higher satisfaction rating than the other gamers, or because the subscriber likes the particular gamer. This selection transitions to a GUI that lists video games which Gamer X has provided differing UI device configurations. Upon selecting the first video game, the portal 202 presents another GUI with a selection of UI device configurations. Each UI device can be listed separately so that the subscriber can selectively choose the UI devices of interest. In this example, the subscriber chooses the navigation device and the audio system configurations supplied by Gamer X for "Video Game 1".

Upon selecting the OK GUI button, the portal 202 begins to download the navigation device and audio system configurations to the computing device 100 of the subscriber (depicted by the download progress GUI). Once the navigation device and audio system configurations have been successfully downloaded, the subscriber has the option to apply the configurations or reject the update. When the OK button is selected the computing device 100 updates the UI devices per the downloaded configurations and begins operating said UI devices in accordance with these configurations. The update process can be executed by configuration software operating in the computing device by way of its operating system or software downloaded from the portal 202.

It would be apparent to an artisan of ordinary skill in the art that the GUIs depicted in FIG. 4 are illustrative and non-limiting. Said artisan can expect that any GUI arrangement can be used to effectuate steps 312-318. Additionally, it would be apparent to said artisan that the organization of subscribers, and the categorization of UI device configurations can be arranged in other ways while effectuating an end result of updating UI device configurations of a computing device 100 by way of portal 202.

Method 300 can further include steps for rating the UI device configurations downloaded from the portal 202. In step 320, the portal 202 can for example, detect that a subscriber has invoked a process to submit a satisfaction rating using a software application supplied by the portal 202 and operating in the computing device 100 or by way of a browser interface to the portal. The satisfaction rating can be a simple GUI selection of zero to five stars, five stars being the highest level of satisfaction, with half stars also selectable. Once the selection has been made, the portal software operating in the computing device 100 or the browser transmits to the portal 202 the satisfaction rating in step 322, which the portal records in step 324 according to the source of the UI device configuration, which in this illustration, is Gamer X. The portal 202 can use the supplied rating of this subscriber (and others downloading the same or similar UI device configurations of Gamer X) to update the satisfaction rating of Gamer X.

Whether or not a satisfaction rating is provided by the subscriber, the subscriber can be presented by way of portal 202 or portal software operating locally in the computing device 100 an option in step 326 to restore the preexisting UI device configurations. If a restoration option is selected in step 326, the computing device 100 can proceed to step 328 and restore UI device configurations existing before step 318.

From the foregoing descriptions, it would be evident to an artisan with ordinary skill in the art that the aforementioned embodiments can be modified, reduced, or enhanced without departing from the scope and spirit of the claims described below. For example, method 300 can be adapted so that UI device configurations can be archived partially. That is, subscribers can choose to upload or download portions of UI device configurations rather than a full configuration set. In yet another embodiment, method 300 can be adapted so that the service provider of the portal 202 exclusively defines the grouping of subscribers and categories of UI device configurations. This embodiment can be useful in social networks in which an expected behavior or outcome is desired by the service provider of the portal 202.

Other suitable modifications can be applied to the present disclosure. Accordingly, the reader is directed to the claims for a fuller understanding of the breadth and scope of the present disclosure.

Figure 5:
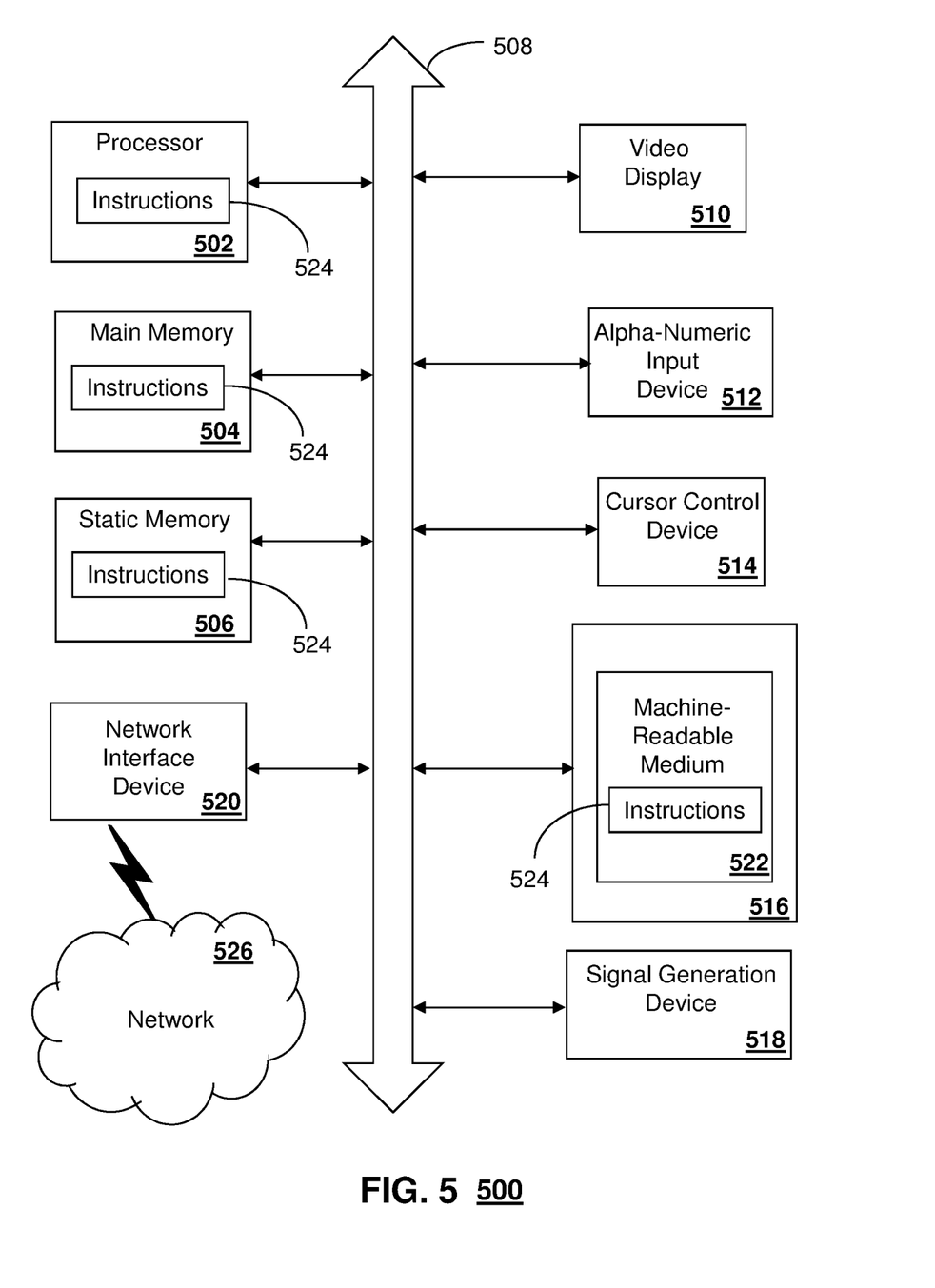
FIG. 5 depicts an illustrative diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
a processor; and
a memory that stores executable instructions that, when executed by the processor, facilitate performance of operations, comprising:
receiving peripheral device settings from a user;
receiving a user selection of a software program from a group of software programs from a system over a network;
retrieving the peripheral device settings according to the software program selected, wherein the peripheral device settings are associated with the user of a plurality of users; and
sending the peripheral device settings over the network to the system, wherein the peripheral device settings are configured for use by one or more portable devices, wherein the sending of the peripheral device settings to the system causes the system to store the peripheral device settings in a memory remote from the one or more portable devices, wherein the sending of the peripheral device settings to the system causes the system to enable selective reconfiguration of at least one of the one or more portable devices, and wherein the peripheral device settings configure an operation of at least one of the one or more portable devices during execution of the software program by the system.

2. The server of claim 1, wherein the user selection is made through a graphical user interface.

3. The server of claim 2, wherein the graphical user interface is a web page and wherein the operations further comprise sending the web page.

4. The server of claim 2, wherein the group of software programs are video games.

5. The server of claim 4, wherein the sending of the peripheral device settings to the system causes the system to selectively enable access to the peripheral device settings for configuration of the operation of a portable device of the one or more portable devices.

6. The server of claim 5, wherein the configuration of the portable device enables a user to play the video game selected utilizing the peripheral device settings on the portable device.

7. The server of claim 6, wherein the video game is hosted by a host server over the network.

8. The server of claim 1, wherein the operations further comprise receiving peripheral device settings for configuration of a portable device of the one or more portable devices.

9. The server of claim 1, wherein the portable device comprises an accessory for controlling the software program.

10. The server of claim 1, wherein the peripheral device settings comprise a navigation configuration, a pointer speed configuration, or a combination thereof.

11. The server of claim 1, wherein the operations further comprise receiving ratings information associated with the peripheral device settings.

12. The server of claim 11, wherein the operations further comprise generating ratings data based on the ratings information and providing the ratings data to the system.

13. The server of claim 1, wherein the operations further comprise sharing the peripheral device settings with other users of the plurality of users.

14. The server of claim 13, wherein the operations further comprise receiving ratings information associated with the peripheral device settings from the other users.

15. A non-transitory computer-readable storage medium comprising executable instructions that, when executed by a processor, cause the processor to perform operations comprising:

receiving a categorized listing of selectable peripheral device configurations from a server, wherein the categorized listing of selectable peripheral device configurations is based on peripheral device settings that are provided to the server by a user, and wherein the peripheral device settings are associated with the user of a plurality of users;

sending a selection for one or more peripheral device configurations;

downloading the one or more peripheral device configurations;

configuring one or more peripheral devices using the one or more peripheral device configurations;

sharing the peripheral device settings with other users of the plurality of users; and receiving ratings information associated with the peripheral device settings from the other users, wherein the peripheral device configurations are selected according to user input received by the processor.

16. The non-transitory computer-readable storage medium of claim 15, wherein the peripheral device settings comprise a navigation configuration, a pointer speed configuration, or a combination thereof.

17. The non-transitory computer-readable storage medium of claim 15, wherein the peripheral device configurations enable a user to play a video game selected with the selection of the one or more peripheral device configurations.

18. The non-transitory computer-readable storage medium of claim 15, wherein the peripheral device settings that are provided to the server by the user are based on user selections in a graphical user interface from among different settings applicable to a particular peripheral device, wherein the operations further comprise saving and restoring a preexisting peripheral device configuration for one or more peripheral devices.

19. A method comprising:

receiving, by a system including a processor, peripheral device settings over a network, wherein the peripheral device settings are configured for use by one or more portable devices, wherein the peripheral device settings are generated from user selections associated with a graphical user interface presented by a first computing device, wherein the peripheral device settings configure an operation of the one or more portable devices according to one or more user preferences identified by the user selections, wherein the user selections include selection of a video game, and wherein the peripheral device settings are based on the video game selected;

storing, by the system, the peripheral device settings in a memory, wherein the memory is remote from the one or more portable devices and the first computing device;

receiving, by the system, a request over the network for the peripheral device settings, wherein the request is initiated by a portable device of the one or more portable devices; and providing, by the system, the peripheral device settings over the network to a second computing device responsive to the request, wherein the providing of the peripheral device settings enables configuration of a portable device of the one or more portable devices according to the peripheral device settings, and the video game selected utilizes the peripheral device settings.

20. The method of claim 19, wherein the peripheral device settings are received from the first computing device responsive to the user selections in the graphical user interface presented by the first computing device in an Internet browser, wherein the user selections include changing a user interface by selecting from among a group of settings, wherein the graphical user interface enables generating multiple configurations, and wherein each of the multiple configurations is associated with a different configuration profile.

* * * * *